United States Patent [19]
Bolton et al.

[11] Patent Number: 4,740,091
[45] Date of Patent: Apr. 26, 1988

[54] SUPPORT FOR AIR CONDITIONER SLEEVE

[75] Inventors: Theodore S. Bolton, Liverpool; John T. Fazzio, East Syracuse, both of N.Y.

[73] Assignee: Carrier Corporation, Syracuse, N.Y.

[21] Appl. No.: 909,387

[22] Filed: Sep. 19, 1986

[51] Int. Cl.⁴ .................................................. F16D 1/00
[52] U.S. Cl. ..................................... 403/24; 403/288; 62/262
[58] Field of Search ....................... 277/181, 189, 184; 285/398, 275, 424; 62/262; 220/80; 403/24, 335, 336, 360, 288

[56] References Cited

U.S. PATENT DOCUMENTS

| | | | |
|---|---|---|---|
| 1,791,255 | 2/1931 | Wagner | 285/424 X |
| 2,313,881 | 3/1943 | Lewis | 220/80 X |
| 2,417,769 | 3/1947 | Leonard et al. | 220/80 X |
| 2,828,046 | 3/1958 | Weinman | 220/80 |
| 3,512,805 | 5/1970 | Glatz | 403/305 X |
| 3,831,395 | 8/1974 | Levy | 62/263 |
| 4,565,381 | 6/1986 | Joelson | 285/231 X |

FOREIGN PATENT DOCUMENTS

| | | | |
|---|---|---|---|
| 381481 | 6/1934 | United Kingdom | 403/288 |
| 1458912 | 12/1976 | United Kingdom | 285/424 |

Primary Examiner—Andrew V. Kundrat
Attorney, Agent, or Firm—Dana F. Bigelow

[57] ABSTRACT

The interface bracket, which supports a sealing gasket between the lower surface of a base pan and the front face of a sleeve lower wall, is designed so as to extend under the sleeve lower wall so as to overlap and support the lower wall from sagging. The integrity of the sealing relationship is therefore maintained. Provision is also made to automatically cam the sleeve lower wall from a sagged position by the use of a bracket with an angled leading edge.

7 Claims, 2 Drawing Sheets

SUPPORT FOR AIR CONDITIONER SLEEVE

BACKGROUND OF THE INVENTION

This invention relates generally to air conditioning systems and, more particularly, to base pan structures for air conditioning systems of the type having a chassis-containing sleeve.

In a so-called PTAC (i.e., packaged terminal air conditioning) system, the apparatus is mounted in the wall by way of a sleeve which slideably receives the chassis therein. Traditionally, one of the interfaces between the sleeve and the chassis is a gasket which seals the space between the front face of the sleeve and the base pan of the chassis. This has commonly been accomplished by way of a z-shaped bracket one leg of which is secured to the bottom of the base pan and the other legs of which support a gasket attached for abutting against the inner surface of the lower wall of the sleeve when the chassis is installed so as to thereby establish a sealed relationship between the sleeve and the base pan.

It has been found that with the use of some materials the sleeve tends to sag in the middle such that when the chassis is subsequently installed, the gasket may not mate well with the sleeve lower wall to provide a good sealing relationship across the entire width. A sleeve made from a plastic material for example, is susceptible to such a phenomena since a plastic sleeve tends to sag simply from its own weight. A resulting poor sealing relationship may cause leakage of water and outdoor air into the room being conditioned.

It is therefore an object of the present invention to provide an improved packaged terminal air conditioning system installation.

Another object of the present invention is the provision in an air conditioning system for establishing a good sealing relationship between a chassis and a containment sleeve.

Yet another object of the present invention is the provision in a packaged terminal air conditioning system for the use of plastic sleeves without attendant leakage problems.

Still another object of the present invention is the provision for correcting a leakage problem associated with the deformation of containment sleeves.

Yet another object of the present invention is the provision for a sealing bracket which is economical to manufacture and extremely functional in use.

These objects and other features and advantages become more readily apparent upon reference to the following description when taken in conjunction with the appended drawings.

SUMMARY OF THE INVENTION

Briefly, in accordance with one aspect of the invention, the second and third legs of a conventional interface bracket are lengthened such that the third leg extends under the bottom wall of the sleeve in an overlapping manner. In this way, it provides support for the sleeve wall and maintains the wall in its proper position against the sealing gasket.

In accordance with another aspect of the invention, the third leg is so formed that its edge angles inwardly from its ends such that there is gradually less overlap toward the middle thereof. Because of this angled form, when the base pan and attached bracket are moved into place, the end portions of the third leg are the first to overlap the sleeve wall. As the overlap gradually increases, any sag that may exist in the sleeve wall will be gradually cammed upwardly into its proper position by the gradual engagement of the angled surface. In this way, a proper sealing relationship is established and maintained.

In the drawings as hereinafter described, preferred and modified embodiments are depicted. However, various other modifications and alternate constructions can be made thereto without departing from the true spirit and scope of the invention.

DESCRIPTION OF THE PREFERRED EMBODIMENT

Figure 1:
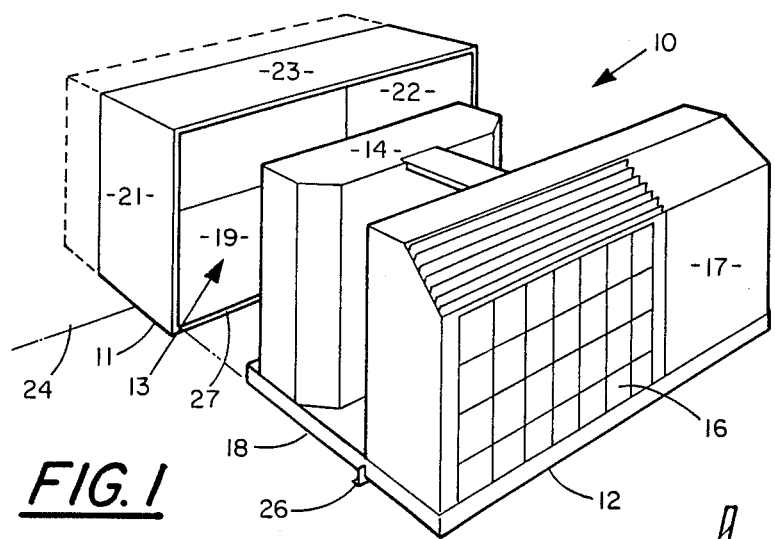
FIG. 1 is an exploded perspective view of an air conditioning system particularly suited for use with the present invention.

Referring now to FIG. 1, a typical packaged terminal air conditioning system is shown generally at 10 to include a generally rectangular shaped sleeve 11 and a chassis 12 which slides into the sleeve opening 13 in such a way that its condenser coil 14 is exposed to the outside air and its evaporator coil (not shown) communicates with the indoor air by way of a grille structure 16 in the front cover 17. A base pan 18 is provided to contain the various components in the chassis 12 and to facilitate the installation of the chassis 12 into the sleeve opening 13 where it rests on the sleeve lower wall 19.

In addition to the lower wall 19, the sleeve includes side walls 21 and 22, and top wall 23. The dotted line indicates that portion of the sleeve 11 which is contained within the wall 24, while the solid line indicates that portion which extends inwardly from the wall 24. As can be seen, a substantial portion of the sleeve 11 is cantilevered inwardly from the wall 24. This relationship may cause a sagging of the sleeve lower wall 19 with its attendant problems as mentioned in the background discussion hereinabove.

Figure 2:
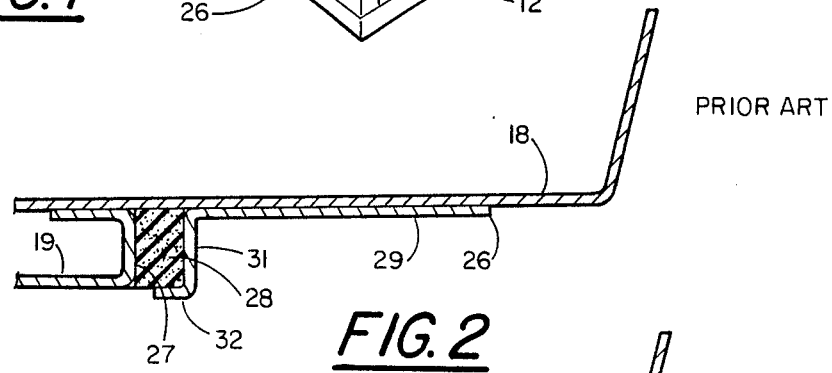
FIGS. 2-3 are partial sectional views of the interface bracket in accordance with the prior art.
Figure 3:
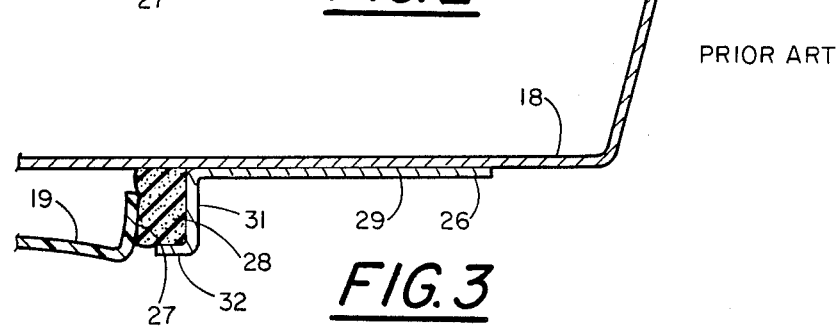
Figure 4:
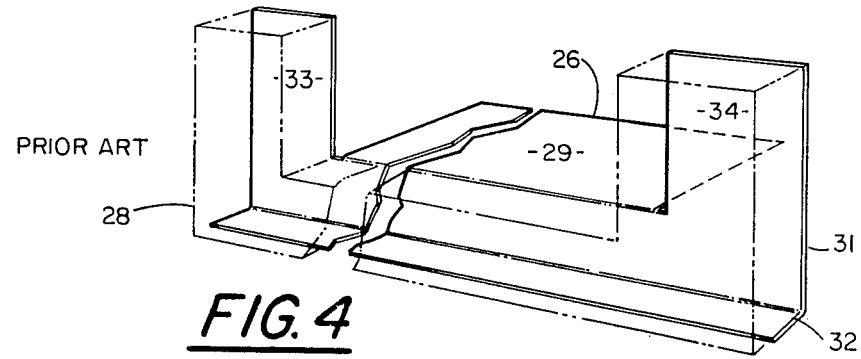
FIG. 4 is a perspective view thereof.

Attached to the lower surface of the base pan 18 is an interface bracket 26 which extends transversely across the width of the base pan 18 and acts to provide a sealed condition between the base pan 18 and the front face 27 of the sleeve lower wall 19. Referring to FIGS. 2-4, a typical prior art installation is shown where an interface bracket 26 is welded to the base pan 18 in such a way as to support a gasket 28 that abuts the front face 27 of the sleeve lower wall 19. The interface bracket is z-shaped in form and includes a first leg 29 that is secured to the base pan 18, a second leg 31 that extends normally down therefrom, and a third leg 32 that extends substantially normally from the end of the second leg 31 as shown. As will be seen in FIG. 4, the bracket second leg 31 includes at its ends the tabs 33 and 34 which extend upwardly from the plane of the first leg 29 for attaching the ends of the gasket 28 thereto for support thereof as shown.

The gasket 28 is secured to and supported by the second and third legs 31 and 32, respectively which closely surround its two sides as shown.

When the proper relationship exists between the sleeve lower wall 19 and the base pan 18, as shown in FIG. 2, the front face 27 of the sleeve lower wall 19 is securely engaged along its entire surface with the gasket 28 to thereby provide a proper sealing relationship between the sleeve lower wall 19 and the base pan 18. However, if the sleeve lower wall 19 tends to sag as shown in FIG. 3, then the integrity of the seal is affected and leakage of air and water into the room is likely to occur. In particular, if there is a significant delay between the time that the sleeve 11 is installed and the chassis 12 is installed into the sleeve 11, the sleeve lower wall 19 may very well sag to the position shown in FIG. 3. When the chassis 12, with its associated base pan 18 and attached interface bracket 26 is subsequently installed, a proper sealing relationship is never established and leakage is likely to occur.

Figure 5:
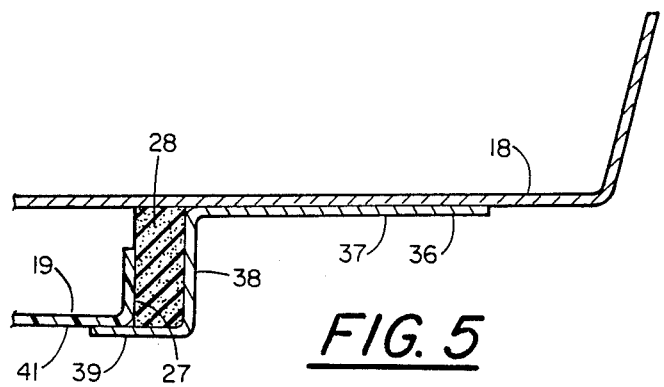
FIG. 5 is a partial sectional view of the interface bracket in accordance with one embodiment of the invention.
Figure 6:
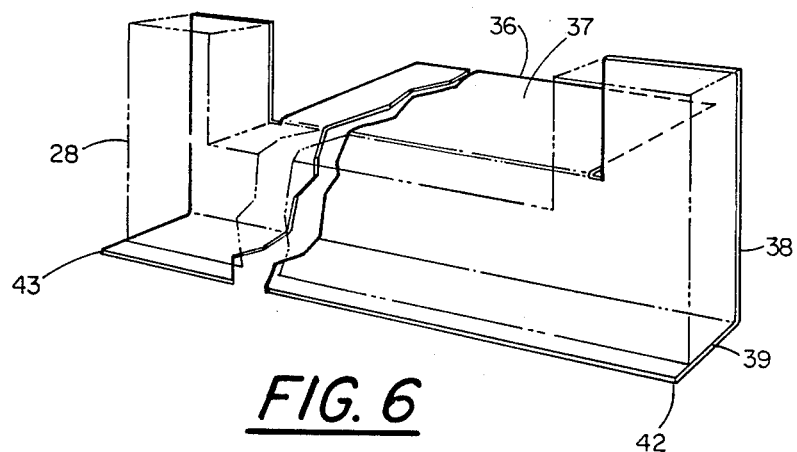
FIG. 6 is a perspective view thereof.

The improved interface bracket of the present invention is shown at 36 in FIGS. 5 and 6. The first leg 37 is substantially the same as that of the prior art device and is attached to the bottom of the base pan 18 by welding or the like. The second leg 38 extends downwardly to a level below the plane of the sleeve lower wall 19. The third leg 39 extends normally from the end of the second leg 38, with its length being sufficient so as ro overlap a portion of the sleeve lower wall 19 and thereby engage the bottom surface 41. In this way, the third leg 39 acts to support the sleeve lower wall 19 to prevent it from sagging downwardly, thereby maintaining the desired relationship between the front face 27 of the sleeve lower wall and the base pan 18, with the gasket 28 properly sealing the interface therebetween.

Recognizing that at the time the chassis is installed, the sleeve lower wall 19 may have already sagged to the point as shown in FIG. 3 where the bracketed third leg 39 will not slide under the sleeve lower wall 19. This is particularly true near the center of the sleeve where the degree of sagging is at its greatest. Since there is no sagging at the ends of the sleeve lower wall near the side walls 21 and 22, the bracket 36 can be installed, notwithstanding the fact that the sleeve lower wall has sagged, by slightly canting it such that one of the corners 42 or 43 is the first to contact the sleeve lower wall 19. Once one of the corners 42 or 43 has been inserted into an overlapping position under the sleeve lower wall 19, then one can gradually move the overlap toward the other end such that the sleeve lower wall 19 is gradually "cammed" upwardly to a proper non-sagging position as shown in FIG. 5.

Figure 7:
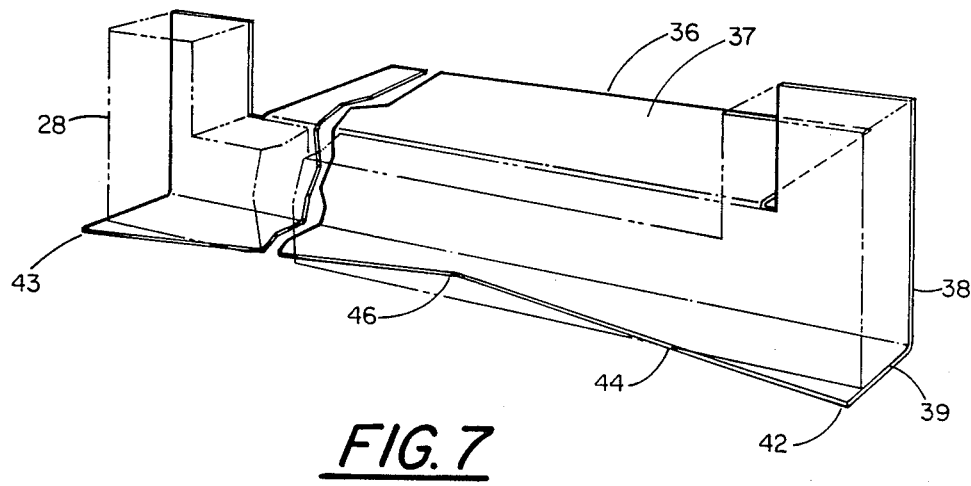
FIG. 7 is a perspective view of a modified embodiment of the invention.

Shown in FIG. 7 is an alternative and preferred embodiment of the present invention wherein the above described camming action is automatically obtained without the need for canting of the bracket 36 during installation. As can be seen, the leading edge 44 of the third leg 39 is angled inwardly from each end to a middle point 46 where the depth of the third leg 39 is at a minimum. In installing the bracket 36, the chassis can be moved straight inwardly without canting to the side since the two corners 42 and 43 will then automatically first engage the sleeve lower wall 19. The point of engagement will then automatically move inwardly along the angled leading edge 44 to gradually cam up the sagging sleeve lower wall 19 until, finally, the middle point 46 will slide under the lower surface 41 to the supporting position as shown in FIG. 5.

It will be understood that the present invention has been described in terms of preferred and modified ebodiments, but may take on any number of other forms while remaining within the scope and intent of the invention.

What is claimed is:

1. In an air conditioning system of the type having a chassis and associated base pan for placement within a containment sleeve having inner and lower walls, a z-shaped interface bracket for establishing a sealing relationship between the base pan and the sleeve, comprising:
   a first leg attached to the bottom of the base pan and extending laterally thereacross:
   a second leg extending substantially normally from the lateral edge of said first leg and adapted to receive against its one face a gasket for abutting against the inner wall of the sleeve: and
   a third leg extending substantially normally from a lateral edge of said second leg to overlap and support the underside of the sleeve lower wall.

2. An interface bracket as set forth in claim 1 wherein said third leg has its lateral edge angled inwardly from each end such that when it is placed in position, the overlapping occurs gradually from the ends toward the middle thereof.

3. An interface bracket as set forth in claim 1 wherein said first leg is welded to the base pan.

4. In an air conditioning system of the type having a sleeve and a base pan with a z-shaped interface bracket having a first leg attached to and extending laterally across and the bottom of the base pan, a second leg extending substantially normally from the lateral edge thereof, and a third leg extending substantially normally from the lateral edge of said second leg with said second and third legs bearing a gasket for abutting against a sleeve lower wall, an improved interface bracket wherein said second and third legs are sufficiently long that said third leg extends below said sleeve lower wall to overlap and provide support therefor.

5. An improved interface bracket as set forth in claim 4 wherein said third leg has its lateral edge angled inwardly from its ends such that there is gradually less overlap toward the middle thereof.

6. In an air conditioning system of the type having a sleeve with an inner and bottom wall which are susceptible to sagging and a chassis with a base pan that is installed into the sleeve, a bracket for interfacing between the base pan and the sleeve bottom wall, comprising:
   a first leg attached to the bottom surface of the base pan;
   a second leg extending substantially normally from said first leg and having a gasket held between one face thereof and said inner wall of the sleeve; and
   a third leg extending substantially normally from said second leg such that when the base pan is placed into position, the third leg overlaps the sleeve bottom wall and tends to support it in such a position as to maintain a sealing relationship between the sleeve inner wall and said gasket.

7. a bracket as set forth in claim 6 wherein said third leg is angled at its edge so as to be of decreasing width towards its middle, such that when it is placed in position, it will overlap the sleeve bottom wall first at its ends and then gradually toward its middle.

* * * * *